US009402263B2

(12) United States Patent
Guo

(10) Patent No.: US 9,402,263 B2
(45) Date of Patent: Jul. 26, 2016

(54) RADIO RESOURCE CONTROL METHOD AND DEVICE

(75) Inventor: Shengxiang Guo, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 0 days.

(21) Appl. No.: 14/370,869

(22) PCT Filed: Mar. 15, 2012

(86) PCT No.: PCT/CN2012/072403
§ 371 (c)(1),
(2), (4) Date: Aug. 5, 2014

(87) PCT Pub. No.: WO2013/104144
PCT Pub. Date: Jul. 18, 2013

(65) Prior Publication Data
US 2015/0139092 A1 May 21, 2015

(30) Foreign Application Priority Data

Jan. 9, 2012 (CN) .......................... 2012 1 0004675

(51) Int. Cl.
H04W 72/08 (2009.01)
H04L 5/00 (2006.01)
H04B 17/318 (2015.01)
H04W 72/04 (2009.01)

(52) U.S. Cl.
CPC ............. *H04W 72/082* (2013.01); *H04L 5/001* (2013.01); *H04L 5/0044* (2013.01); *H04L 5/0062* (2013.01); *H04B 17/318* (2015.01); *H04L 5/0098* (2013.01); *H04W 72/0453* (2013.01); *H04W 72/085* (2013.01)

(58) Field of Classification Search
None
See application file for complete search history.

(56) References Cited

U.S. PATENT DOCUMENTS

2001/0016499 A1    8/2001  Hamabe
2011/0142009 A1*   6/2011  Lindoff .................. H04L 5/0053
                                                        370/332

(Continued)

FOREIGN PATENT DOCUMENTS

CN    101984700 A    3/2011
CN    102076096 A    5/2011

(Continued)

OTHER PUBLICATIONS

Supplementary European Search Report in European application No. 12865283.1, mailed on Aug. 11, 2015.

(Continued)

*Primary Examiner* — Huy D Vu
*Assistant Examiner* — James P Duffy
(74) *Attorney, Agent, or Firm* — Oppedahl Patent Law Firm LLC

(57) ABSTRACT

The disclosure discloses a radio resource control method and device, the radio resource control method includes that: a User Equipment (UE) detects the Reference Signal Receiving Power (RSRP) of each component carrier and determines whether or not a preset requirement for image interference due to power imbalance is met according to the result of the detection; and a preset image interference avoidance strategy is performed if the preset requirement for image interference due to power imbalance is met. The disclosure is capable of addressing the problem that the power imbalance between component carriers adjacent in frequency degrades communication performance.

12 Claims, 2 Drawing Sheets

(56) References Cited

U.S. PATENT DOCUMENTS

| | | | |
|---|---|---|---|
| 2012/0021753 A1 | 1/2012 | Damnjanovic et al. | |
| 2012/0213095 A1* | 8/2012 | Krishnamurthy | H04L 5/001 370/252 |
| 2013/0016221 A1* | 1/2013 | Charbit | H04W 16/14 348/180 |

FOREIGN PATENT DOCUMENTS

| | | |
|---|---|---|
| CN | 102202351 A | 9/2011 |
| EP | 1128573 A2 | 8/2001 |
| JP | 2012527170 A | 11/2012 |
| JP | 2012527171 A | 11/2012 |
| JP | 2013507070 A | 2/2013 |
| WO | 2010132294 A1 | 11/2010 |
| WO | 2011041700 A1 | 4/2011 |
| WO | 2011088465 A1 | 7/2011 |
| WO | 2011140624 A1 | 11/2011 |

OTHER PUBLICATIONS

International Search Report in international application No. PCT/CN2012/072403, mailed on Oct. 18, 2012. (2 pages—see entire document).
English Translation of the Written Opinion of the International Search Authority in international application No. PCT/CN2012/072403, mailed on Oct. 18, 2012. (7 pages—see entire document).
Intel Corporation, Discussions on Carrier Aggregation across LTE and WiFi, 3GPP TSG-RAN Meeting #53 RP-111094, [online], pp. 1-4, [Mar. 25, 2016], "RP-111094 Discussion Paper LTE-WiFi CA.doc", URL, http://www.3gpp.org/ftp/tsg_ran/TSG_RAN/TSGR_53/Docs/RP-111094.zip, mailed on Aug. 15, 2011.

* cited by examiner

RADIO RESOURCE CONTROL METHOD AND DEVICE

TECHNICAL FIELD

The disclosure relates to the Carrier Aggregation (CA) technology used in the Long Term Evolution-Advanced (LTE-A), and more particularly to a radio resource control method and device.

BACKGROUND

In order to meet the requirement of the International Telecommunications Union (ITU) on the future peak rate, the maximum bandwidth currently supported by the LTE-A is 100 MHz, while it is hard to find such a wide bandwidth in existing available spectrum resources. Additionally, a wide bandwidth complicates the hardware design of base stations and terminals. Moreover, a technology is urgently needed to make full use of the spectrum resources distributed in a plurality of frequency bands. Based on this consideration, a key technology of carrier aggregation is introduced in the LTE-A.

In carrier aggregation, the power imbalance among a plurality of component carriers adjacent in frequency causes severe image interference because image interference is caused once the image signal of a component carrier generated due to the In-phase/Quadrature (I/Q) gain imbalance and the integral error of the receiving circuit of a User Equipment (UE) falls onto another component carrier. Generally, if the power difference between the two component carriers is small and the UE passes a test on an image rejection requirement as specified in a standard, the image interference is small.

This small image interference causes no loss in system performance and is therefore ignorable. However, in some cases, the aggregation of component carriers required to cover different areas will lead to a great power difference between the component carriers. Then, the image of a large-power component carrier causes severe image interference to a small-power component carrier, which undermines the receiving performance of the small-power component carrier, degrades the overall communication performance of carrier integration and even interrupts communication. As such interference generally occurs in adjacent component carriers, such interference mainly occurs in an intra-band CA scenario and never occurs in an inter-band CA scenario.

The power imbalance refers to the power inequality between individual Resource Elements (RE), although the power difference between adjacent component carriers is not big in most scenarios and the power imbalance does not cause any significant problems, CA technology, with a capability of making good use of spectrum resources and increasing transmission rate, is attracting more and more operators, especially, with the application of more and more CA scenarios, the problem of the power imbalance between adjacent component carriers becomes more and more serious, and therefore, it is necessary to provide a method to address the problem of the power imbalance between adjacent component carriers.

SUMMARY

In view of this, the disclosure is intended to provide a radio resource control method and device to address the problem that the power imbalance between component carriers adjacent in frequency degrades communication performance.

To achieve the purpose above, the technical solutions of the disclosure are provided as follows.

In an embodiment, a radio resource control method is provided, including the following steps that: a UE detects the Reference Signal Receiving Power (RSRP) of each component carrier and determines whether or not a preset requirement for image interference due to power imbalance is met according to the result of the detection; and a preset image interference avoidance strategy is performed if the preset requirement for image interference due to power imbalance is met.

Preferably, the performing the preset image interference avoidance strategy includes: selecting one of the component carriers which is most different from the other component carriers in RSRP as a target component carrier; and determining whether or not the selected target component carrier is a primary component carrier, if yes, switching the target component carrier to the one of the rest corresponding active component carriers having the maximum RSRP, releasing the former target component carrier and performing normal communication, otherwise, releasing the target component carrier and performing normal communication.

Preferably, the performing the preset image interference avoidance strategy includes: if there are two component carriers, selecting one with a lower RSRP as the target component carrier.

Preferably, the image interference generation condition includes: among the component carriers, there are at least two component carriers with an absolute value of their RSRP difference greater than a power imbalance threshold.

Preferably, the power imbalance threshold is 6 dB.

In an embodiment, a radio resource control device is provided, including: a detecting and determining module configured to detect the RSRP of each component carrier of a UE and determine whether a preset requirement for image interference due to power imbalance is met according to the result of the detection; and an interference avoidance module configured to perform a preset image interference avoidance strategy if the detecting and determining module determines that the preset requirement for image interference due to power imbalance is met.

Preferably, the performing the preset image interference avoidance strategy includes: selecting one of the component carriers which is most different from the other component carriers in RSRP as a target component carrier; and determining whether or not the selected target component carrier is a primary component carrier, if yes, switching the target component carrier to the one of the rest corresponding active component carriers having the maximum RSRP, releasing the former target component carrier and performing normal communication, otherwise, releasing the target component carrier and performing normal communication.

Preferably, the performing the preset image interference avoidance strategy includes: if there are two component carriers, selecting one with a lower RSRP as the target component carrier.

Preferably, the image interference generation condition includes: among the component carriers, there are at least two component carriers with an absolute value of their RSRP difference greater than a power imbalance threshold.

Preferably, the power imbalance threshold is 6 dB.

The disclosure provides a radio resource control method and device which detect the RSRP of each component carrier and determine whether or not a preset requirement for image interference due to power imbalance is met according to the result of the detection; and perform a preset image interference avoidance strategy if the preset requirement for image interference due to power imbalance is met. With the disclosure, it is capable of addressing the problem that the power imbalance between component carriers adjacent in frequency degrades communication performance in a carrier aggregation scenario, thereby reducing the image interference caused by the power imbalance between component carriers adjacent in frequency and improving communication performance.

DETAILED DESCRIPTION

Figure 1:
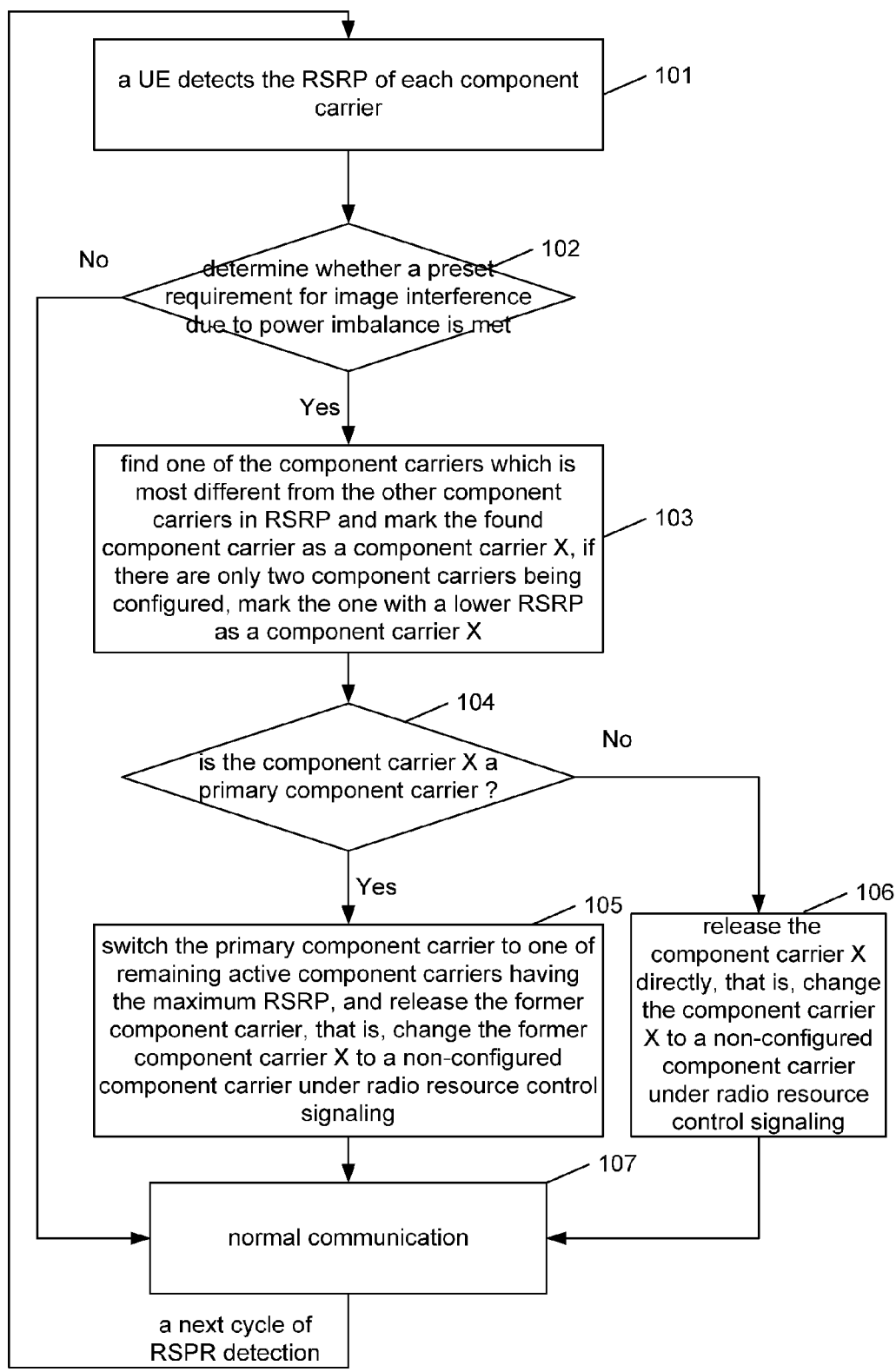
FIG. 1 is a flowchart illustrating a radio resource control method according to an embodiment of the disclosure.
Figure 2:
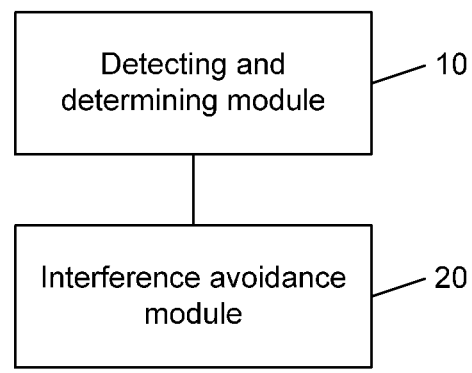
FIG. 2 is a schematic diagram illustrating the structure of a radio resource control device according to an embodiment of the disclosure.

The technical solutions are described below in detail with reference to accompanying drawings when read in conjunction with embodiments.

The inventor has found in practice that image interference caused by the power imbalance between adjacent component carriers generally occurs when the following conditions are met:

1: there are at least two or more component carriers adjacent to a center carrier;

2: the power imbalance between component carriers exceeds a certain threshold which is proved by a lot of experiments and simulations to be proper to be 6 dB, and undoubtedly, the smaller the threshold is, the less the image interference is.

The communication performance of a system is severely degraded only when both the aforementioned two conditions are met, and the problem of the image interference caused by the power imbalance between adjacent component carriers is ignorable as long as the receiver of a UE meets an image rejection requirement as specified in a standard. The disclosure addresses the problem of the image interference caused by such power imbalance based on the aforementioned two conditions.

It is regulated in the Long Term Evolution (LTE) standard that the carrier used by a UE is referred to as a configured component carrier and an unused carrier is referred to as a non-configured component carrier, where configured and non-configured are related to each UE, component carriers can be increased or released for a UE using Radio Resource Control (RRC) signaling, and configured component carriers are further classified into active component carriers and deactivated component carriers. Although the deactivated component carriers are not used to transmit data, they maintain some basic measurement information. Thus, the power imbalance problem occurs not only between active component carriers but also between deactivated component carriers.

Based on the foregoing analysis, the radio resource control method disclosed herein mainly includes that: a UE detects the Reference Signal Receiving Power (RSRP) of each component carrier and determines whether or not a preset requirement for image interference due to power imbalance is met according to the result of the detection; and a preset image interference avoidance strategy is performed if the preset requirement for image interference due to power imbalance is met.

The performing of the preset image interference avoidance strategy includes: selecting one of the component carriers which is most different from the other component carriers in RSRP as a target component carrier; and determining whether or not the selected target component carrier is a primary component carrier, if yes, switching the target component carrier to one of the rest corresponding active component carriers having a maximum RSRP, releasing the former target component carrier and performing normal communication; otherwise, releasing the target component carrier and performing normal communication.

The image interference avoidance strategy further includes: if there are two component carriers, selecting one with lower RSRP as the target component carrier.

The image interference generation condition is as follows: among the component carriers, there are two component carriers of which the absolute value of their RSRP difference is greater than a power imbalance threshold.

As shown in FIG. 1, the specific flow of the radio resource control method provided herein mainly includes the following steps:

Step 101: a UE detects the RSRP of each component carrier;

Step 102: the UE determines whether or not a preset requirement for image interference due to power imbalance is met according to the result of the detection, if yes, executes Step 103, otherwise, executes Step 107 (performs normal communication).

Assume that the RSRP of each component carrier is $RSRP_k$ (k=1, 2, ... n), in which n is the number of the component carriers configured for carrier aggregation in this scenario, the preset requirement for image interference due to power imbalance between adjacent component carriers can be described as follows:

$$|RSRP_i - RSRP_j| > A \text{ (dB)},$$

where i≠j, i=1, 2, ..., n, j=1, 2, ... n

That is, among the component carriers, there are at least two component carriers with an absolute value of their RSRP difference greater than a power imbalance threshold. In the foregoing formula, A is a power imbalance threshold (dB), the specific value of which can be designated by each manufacturer according to the result of the simulations or experiments conducted by the manufacturer. In actual applications, the value of A is preferably 6 dB.

Step 103: one of the component carriers which is most different from the other component carriers in RSRP is selected as a target component carrier and marked as a component carrier X, if there are only two component carriers being configured, then the one with lower RSRP is selected as a target component carrier and marked as a component carrier X.

Step 104: it is determined whether or not the component carrier X is a Primary Component Carrier (PCC), if yes, Step 105 is executed, otherwise, Step 106 is executed.

Step 105: the PPC (component carrier X) is switched to one of the rest corresponding active component carriers having the maximum RSRP, and the former component carrier X is released, that is, the former component carrier X becomes a non-configured component carrier under radio resource control signaling. The flow proceeds to Step 107 after this step is executed.

Step 106: the component carrier X is released directly, that is, the component carrier X becomes a non-configured component carrier under the radio resource control signaling. The flow proceeds to Step 107 after this step is executed.

Step 107: the UE performs normal communication and returns to Step 101 to carry out a next cycle of RSRP detection.

The foregoing radio resource control method is described below in detail with reference to specific embodiments.

In a first embodiment of the disclosure, several carrier aggregation scenarios are defined in the 3rd Generation Partnership Project (3GPP), the carrier aggregation scenarios include a third scenario in which a UE configures component carriers using a carrier providing complete coverage and another carrier providing partial coverage. It is assumed that the carrier providing complete coverage is component carrier 1 and the another carrier providing partial coverage is component carrier 2 which is in the same frequency band with the component carrier 1 and that the UE has two component carriers. The UE meets an image rejection requirement as specified in the 3GPP standard, and the value of A (power imbalance threshold) is 6 dB. The UE detects the RSRP of each component carrier, assume that it is found in a certain detection that the RSRP of the component carrier 1 is greater than that of the component carrier 2 by more than 6 dB and the component carrier 1 is a PCC, it can be determined using the method that the following condition is met:

$|RSRP_1 - RSRP_2| > 6$ (dB)

After determining that the foregoing condition is met, the UE performs a preset image interference avoidance strategy, specifically, the UE selects one of the component carriers which is most different from the other component carriers in RSRP as a target component carrier and marks the selected component carrier as a component carrier X, wherein if there are only two component carriers being configured, the UE selects the one with lower RSRP as a target component carrier and marks the selected component carrier as a component carrier X. Based on the aforementioned assumption, in the embodiment, the component carrier 2 should be marked as a carrier X.

Sequentially, it is determined whether or not the carrier X is a PCC. In the embodiment, the component carrier 2 is a secondary component carrier. Thus, the component carrier 2 is released directly, that is, the component carrier 2 becomes a non-configured component carrier under the radio resource control signaling, then normal communication is started, and a next cycle of RSRP measurement is carried out.

If the component carrier 2 is a PCC in the embodiment, then the PCC is switched to one of the rest corresponding active component carriers having the maximum RSRP, that is, to the component carrier 1, the former component carrier 2 is released, that is, the component carrier 2 becomes a non-configured component carrier under radio resource control signaling, then normal communication is started, and a next cycle of RSRP measurement is carried out.

In a second embodiment of the disclosure, assume that three component carriers, that is, component carriers 1, 2 and 3, are configured by a UE in a certain scenario, where the component carrier 1 is a PCC, the component carrier 2 is active and the component carrier 3 is deactivated. In the embodiment, the UE meets an image rejection requirement as specified in the 3GPP standard, and the value of A (power imbalance threshold) is 6 dB. The UE detects the RSRP of each component carrier and determines that the following condition is met:

$|RSRP_i - RSRP_j| > 6$ (dB), in which $i \neq j$, $i = 1, 2, \ldots, n$, $j = 1, 2, 3$ After determining that the foregoing condition is met, the UE performs a preset image interference avoidance strategy, specifically, the UE selects one of the component carriers which is most different from the other component carriers in RSRP as a target component carrier and marks the selected component carrier as a component carrier X;

if there are only two component carriers being configured, the UE selects the one with lower RSRP as a target component carrier and marks the selected component carrier as a component carrier X. Assume that in the embodiment, the component carrier 2 is marked as a carrier X, that is, the RSRP of the component carrier 2 is most different from those of the component carries 1 and 3.

Sequentially, it is determined whether or not the carrier X is a PCC. In the embodiment, the component carrier 2 is a secondary component carrier. Thus, the component carrier 2 is released directly, that is, the component carrier 2 becomes a non-configured component carrier under radio resource control signaling, then normal communication is started, and a next cycle of RSRP measurement is carried out.

If the component carrier 2 is a PCC in the embodiment, then the PCC is switched to the one of the rest corresponding active component carriers having the maximum RSRP, that is, to the component carrier 1, the former component carrier 2 is released, that is, the component carrier 2 becomes a non-configured component carrier under radio resource control signaling, then normal communication is started, and a next cycle of RSRP measurement is carried out.

A radio resource control device is also provided in an embodiment of the disclosure corresponding to the foregoing radio resource control method. The device is applicable in a UE and mainly includes a detecting and determining module 10 and an interference avoidance module 20.

The detecting and determining module 10 is configured to detect the RSRP of each component carrier of a UE and determine whether or not a preset requirement for image interference due to power imbalance is met according to the result of the detection.

The interference avoidance module 20 is configured to perform a preset image interference avoidance strategy if the detecting and determining module 10 determines that the power imbalance mirror interference generation condition is met.

The performing of the preset image interference avoidance strategy includes:

selecting one of the component carriers which is most different from the other component carriers in RSRP as a target component carrier; and determining whether or not the selected target component carrier is a primary component carrier, if yes, switching the target component carrier to the one of the rest corresponding activated component carriers having the maximum RSRP, releasing the former target component carrier and performing normal communication, otherwise, releasing the target component carrier and performing normal communication.

Preferably, the image interference avoidance strategy further includes if there are two component carriers, selecting one with lower RSRP as the target component carrier.

The image interference generation condition is as follows: among the component carriers, there are at least two component carriers of which the absolute value of the RSRP difference is greater than a power imbalance threshold. The power imbalance threshold is preferably 6 dB.

The mentioned above is merely preferred embodiments of the disclosure but is not to be construed as limitation to the protection scope of the disclosure.

The invention claimed is:

1. A radio resource control method, comprising:
   detecting, by a User Equipment (UE), a Reference Signal Receiving Power (RSRP) of each component carrier;
   determining whether a preset requirement for image interference due to power imbalance is met according to a result of the detection; and performing a preset image interference avoidance strategy if the preset requirement for image interference due to power imbalance is met, wherein performing the preset image interference avoidance strategy comprises:

selecting one of the component carriers whose RSRP is most different from RSRPs of other component carriers as a target component carrier; and determining whether the selected target component carrier is a primary component carrier, if yes, switching the primary component carrier to one of remaining active component carriers having a maximum RSRP, releasing the selected target component carrier and performing normal communication; otherwise, releasing the target component carrier and performing normal communication.

2. The radio resource control method according to claim 1, wherein the preset image interference avoidance strategy further comprises:

if there are two component carriers, selecting one of the component carriers with a lower RSRP as the target component carrier.

3. The radio resource control method according to claim 2, wherein the image interference is generated under the following condition:

among the component carriers, there are two component carriers with an absolute value of their RSRP difference greater than a power imbalance threshold.

4. The radio resource control method according to claim 3, wherein the power imbalance threshold is 6 dB.

5. The radio resource control method according to claim 1, wherein the image interference is generated under the following condition:

among the component carriers, there are two component carriers with an absolute value of their RSRP difference greater than a power imbalance threshold.

6. The radio resource control method according to claim 5, wherein the power imbalance threshold is 6 dB.

7. A radio resource control device, comprising:

a detecting and determining module, configured to detect a Reference Signal Receiving Power (RSRP) of each component carrier for a User Equipment (UE) and determine whether a preset requirement for image interference due to power imbalance is met according to a result of the detection; and an interference avoidance module, configured to perform a preset image interference avoidance strategy when the detecting and determining module determines that the preset requirement for image interference due to power imbalance is met, wherein the interference avoidance module is configured to: when the detecting and determining module determines that the preset requirement for image interference due to power imbalance is met, select one of the component carriers whose RSRP is most different from RSRPs of other component carriers as a target component carrier; and determine whether the selected target component carrier is a primary component carrier, if yes, switch the primary component carrier to one of remaining active component carriers having a maximum RSRP, release the selected target component carrier and perform normal communication; otherwise, release the target component carrier and perform normal communication.

8. The radio resource control device according to claim 7, wherein the preset image interference avoidance strategy further comprises:

if there are two component carriers, selecting one of the component carriers with a lower RSRP as the target component carrier.

9. The radio resource control device according to claim 8, wherein the image interference is generated under the following condition:

among the component carriers, there are two component carriers with an absolute value of their RSRP difference greater than a power imbalance threshold.

10. The radio resource control device according to claim 9, wherein the power imbalance threshold is 6 dB.

11. The radio resource control device according to claim 7, wherein the image interference is generated under the following condition:

among the component carriers, there are two component carriers with an absolute value of their RSRP difference greater than a power imbalance threshold.

12. The radio resource control device according to claim 11, wherein the power imbalance threshold is 6 dB.

* * * * *